US012458200B2

(12) United States Patent
Contreras et al.

(10) Patent No.: US 12,458,200 B2
(45) Date of Patent: Nov. 4, 2025

(54) DETECTING UNWANTED TOUCH EVENTS ON A USER INTERFACE PANEL OF A DISHWASHING APPLIANCE

(71) Applicant: Haier US Appliance Solutions, Inc., Wilmington, DE (US)

(72) Inventors: Maria Alejandra Contreras, Louisville, KY (US); Ricardo Alberto Aguiar, Jr., Clarksville, IN (US)

(73) Assignee: Haier US Appliance Solutions, Inc., Wilmington, DE (US)

(*) Notice: Subject to any disclaimer, the term of this patent is extended or adjusted under 35 U.S.C. 154(b) by 108 days.

(21) Appl. No.: 18/463,995

(22) Filed: Sep. 8, 2023

(65) Prior Publication Data

US 2025/0082172 A1 Mar. 13, 2025

(51) Int. Cl.
*A47L 15/42* (2006.01)
*G10L 15/22* (2006.01)

(52) U.S. Cl.
CPC .......... *A47L 15/4293* (2013.01); *G10L 15/22* (2013.01); *A47L 2501/26* (2013.01); *G10L 2015/223* (2013.01)

(58) Field of Classification Search
CPC ............. A47L 15/4293; A47L 2501/26; A47L 2401/26; A47L 2401/30; A47L 2401/32; A47L 2501/22; A47L 15/0021; A47L 15/0049; A47L 15/4257; G10L 15/22; G10L 2015/223; G10L 25/51
USPC ........................................................... 134/56
See application file for complete search history.

(56) References Cited

U.S. PATENT DOCUMENTS

| | | | | |
|---|---|---|---|---|
| 5,681,401 | A * | 10/1997 | Gardner | A47L 15/0049 134/25.2 |
| 7,969,330 | B2 | 6/2011 | Philipp | |
| 9,860,491 | B2 * | 1/2018 | Park | H04N 7/183 |
| 10,624,522 | B1 * | 4/2020 | Chan | G08B 21/18 |
| 10,756,922 | B2 * | 8/2020 | Doerner | G05B 23/0224 |
| 10,949,022 | B2 | 3/2021 | Lee | |
| 2012/0055091 | A1 * | 3/2012 | Backherms | E05F 15/79 49/31 |
| 2012/0097199 | A1 * | 4/2012 | Tuller | A47L 15/4295 134/56 D |
| 2014/0015814 | A1 | 1/2014 | Santana et al. | |
| 2017/0268924 | A1 * | 9/2017 | Shin | G01V 8/10 |

(Continued)

FOREIGN PATENT DOCUMENTS

| | | | | |
|---|---|---|---|---|
| DE | 10204455 | A1 * | 8/2003 | A47L 15/0052 |
| DE | 102008013557 | A1 * | 9/2009 | D06F 58/52 |

(Continued)

OTHER PUBLICATIONS

Machine translation of DE-10204455-A1 (Year: 2003).*

*Primary Examiner* — Michael E Barr
*Assistant Examiner* — Thomas Bucci
(74) *Attorney, Agent, or Firm* — Dority & Manning, P.A.

(57) ABSTRACT

A method of operating a dishwashing appliance may include a step of recording an audio signal with a first microphone mounted to the sump. The method may also include a step of analyzing the audio signal recorded with the first microphone. The method may further include a step of determining an access position of the door based on the analyzed audio signal. The method may also include a step of directing the dishwashing appliance based on the determined access position of the door.

18 Claims, 8 Drawing Sheets

(56) References Cited

U.S. PATENT DOCUMENTS

| | | | | |
|---|---|---|---|---|
| 2019/0138155 | A1 | 5/2019 | Li | |
| 2019/0343367 | A1* | 11/2019 | Jung | A47L 15/00 |
| 2019/0382941 | A1* | 12/2019 | Hwang | D06F 33/36 |
| 2020/0004273 | A1* | 1/2020 | Han | E03C 1/12 |
| 2020/0041673 | A1* | 2/2020 | Ha | G06N 20/10 |
| 2021/0068612 | A1* | 3/2021 | Park | G08B 21/182 |
| 2022/0257085 | A1* | 8/2022 | Ohayon | A47L 15/0044 |
| 2022/0296073 | A1* | 9/2022 | Durham | A47L 15/0049 |

FOREIGN PATENT DOCUMENTS

| | | | | |
|---|---|---|---|---|
| DE | 102014223144 | A1 * | 5/2016 | G07C 3/08 |
| DE | 102016104980 | A1 * | 9/2017 | G05B 19/0428 |
| DE | 102018009311 | B4 * | 7/2020 | A47L 15/4295 |
| DE | 102020112027 | A1 * | 11/2020 | A47L 15/4257 |
| DE | 102020117342 | A1 * | 1/2022 | A47L 15/0021 |
| EP | 2540208 | A1 * | 1/2013 | F24C 15/02 |
| EP | 3633271 | B1 * | 12/2022 | F24C 7/08 |
| WO | WO2016120535 | A1 | 8/2016 | |

* cited by examiner

DETECTING UNWANTED TOUCH EVENTS ON A USER INTERFACE PANEL OF A DISHWASHING APPLIANCE

FIELD

The present subject matter relates generally to dishwashing appliances, and more particularly, to features and methods for detecting unwanted touch events on a user interface panel of a dishwashing appliance.

BACKGROUND

Dishwashing appliances generally include a tub that defines a wash chamber. Rack assemblies can be mounted within the wash chamber of the tub for receipt of articles for washing. Multiple spray assemblies can be positioned within the wash chamber for applying or directing wash liquid (e.g., water, detergent, etc.) towards articles disposed within the rack assemblies in order to clean such articles. Dishwashing appliances are also typically equipped with one or more pumps, such as a circulation pump or a drain pump, for directing or motivating wash liquid from the sump to, e.g., the spray assemblies or an area outside of the dishwashing appliance.

Dishwashing appliances also include a door for providing selective access to the wash chamber. In order to provide a user with information regarding the dishwashing appliance operation, e.g., such as a status of an operating cycle or an indication that a cycle is complete, status indicators are often positioned on the outer door of the appliance such that they are visible to a user of the appliance. Additionally, in order to provide a user with an interface to set or adjust the operational settings for the dishwashing appliance, a user interface panel is often positioned on the top of the door of the dishwashing appliance.

In some instances, the user interface panel utilizes touch sensors, for example, capacitive touch sensors, that a user of the dishwashing appliance interfaces with. The capacitive touch sensors are capable of detecting variations in capacitance caused by touch events, for instance, touches or taps, from a user of the dishwashing appliance. Based on such detected variations or touch events, input signals indicative of operational settings for the dishwashing appliance may be received, translated, or determined. Notably, drawbacks to the utilization of capacitive touch sensors in a user interface panel exist. For instance, a user of the dishwashing appliance may accidentally touch or interact with the user interface panel when the door is in a fully opened position or one or more intermediate positions, for example, a partially opened position between a closed position and the fully opened position. This may result in the capacitive touch sensor detecting a touch event that may unintentionally change the operational settings of the dishwashing appliance, may unintentionally change the users preferred dishwashing configuration, or may unintentionally lock the user interface panel. Such unintentional inputs or changes may require manual correction by a user. Moreover, the unintentional inputs or changes may be difficult for a user to detect, further complicating any needed corrections.

Accordingly, features and methods for detecting unwanted touch events on the user interface panel would be useful. More particularly, the features and methods capable of detecting or correcting one or more effects of an unwanted or unintentional touch event would be beneficial.

BRIEF DESCRIPTION

Aspects and advantages of the invention will be set forth in part in the following description, or may be obvious from the description, or may be learned through practice of the invention.

In one exemplary embodiment a method of operating a dishwashing appliance including a cabinet defining a wash chamber, a door mounted to the cabinet to selectively restrict access to the wash chamber, a user interface panel mounted to the door, and a sump positioned outside of the wash chamber is provided. The method may include a step of recording an audio signal with a first microphone mounted to the sump. The method may also include a step of analyzing the audio signal recorded with the first microphone. The method may further include a step of determining an access position of the door based on the analyzed audio signal. The method may also include a step of directing the dishwashing appliance based on the determined access position of the door.

In another exemplary embodiment, a dishwashing appliance is provided. The dishwashing appliance includes a cabinet defining a wash chamber. The dishwashing appliance further includes a sump positioned outside of the wash chamber. The dishwashing appliance also includes a first microphone mounted to the sump. The dishwashing appliance further includes a door mounted to the cabinet to selectively restrict access to the wash chamber. The dishwashing appliance also includes a user interface panel mounted to the door. The dishwashing appliance further includes a controller operable for: recording an audio signal with the first microphone; analyzing the audio signal recorded with the first microphone; determining an access position of the door based on the analyzed audio signal; and directing the dishwashing appliance based on the determined access position of the door.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
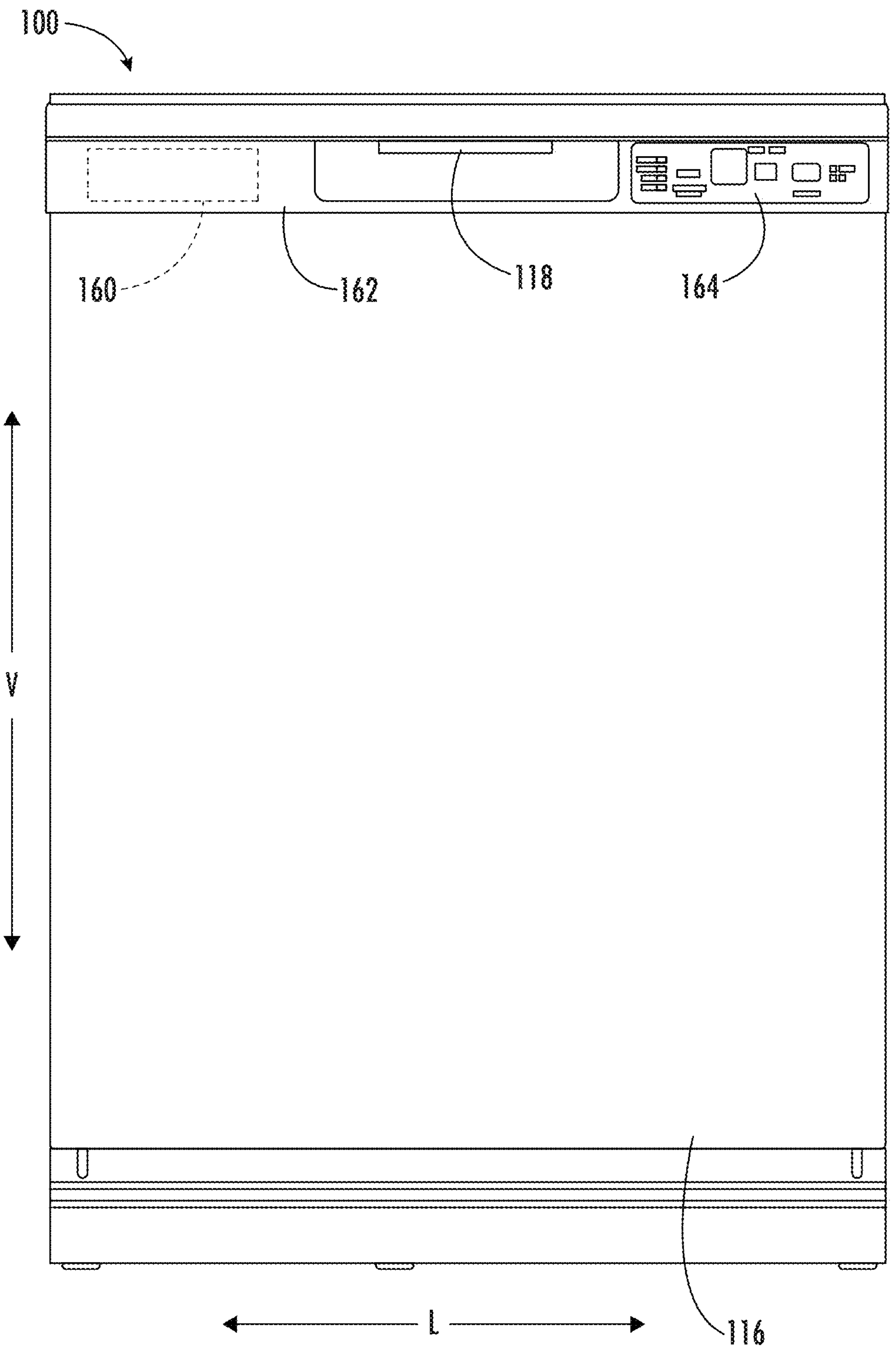
FIG. 1 provides a front view of a dishwashing appliance according to one or more exemplary embodiments of the present subject matter.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the term “or” is generally intended to be inclusive (i.e., “A or B” is intended to mean “A or B or both”). The terms “first,” “second,” and “third” may be used interchangeably to distinguish one component from another and are not intended to signify location or importance of the individual components. The terms “upstream” and “downstream” refer to the relative flow direction with respect to fluid flow in a fluid pathway. For instance, “upstream” refers to the flow direction from which the fluid flows, and “downstream” refers to the flow direction to which the fluid flows. The term “article” may refer to, but need not be limited to dishes, pots, pans, silverware, and other cooking utensils and items that can be cleaned in a dishwashing appliance. The term “wash cycle” is used to refer to an overall operation of the dishwashing appliance which may include two or more distinct phases. The term “wash phase” is intended to refer to one or more periods of time during which a dishwashing appliance operates while containing the articles to be washed and uses a wash liquid (e.g., water, detergent, or wash additive) and may be a portion of the wash cycle, such as a beginning or early portion of the wash cycle. The term “rinse phase” is intended to refer to one or more periods of time during which the dishwashing appliance operates to remove residual soil, detergents, and other undesirable elements that were retained by the articles after completion of the wash phase and may be a portion of the wash cycle, such as an intermediate portion of the wash cycle. The term “drain phase” is intended to refer to one or more periods of time during which the dishwashing appliance operates to discharge soiled water from the dishwashing appliance and may be a portion of the wash cycle, such as a later portion of the wash cycle. The term “wash liquid” refers to a liquid used for washing or rinsing the articles that is typically made up of water and may include additives, such as detergent or other treatments (e.g., rinse aid).

Approximating language, as used herein throughout the specification and claims, may be applied to modify any quantitative representation that could permissibly vary without resulting in a change in the basic function to which it is related. Accordingly, a value modified by a term or terms, such as “generally,” “about,” “approximately,” and “substantially,” are not to be limited to the precise value specified. In at least some instances, the approximating language may correspond to the precision of an instrument for measuring the value, or the precision of the methods or machines for constructing or manufacturing the components or systems. For example, the approximating language may refer to being within a ten percent margin, i.e., including values within ten percent greater or less than the stated value. In this regard, for example, when used in the context of an angle or direction, such terms include within ten degrees greater or less than the stated angle or direction, e.g., “generally vertical” includes forming an angle of up to ten degrees in any direction, e.g., clockwise, or counterclockwise, with the vertical direction V.

Figure 2:
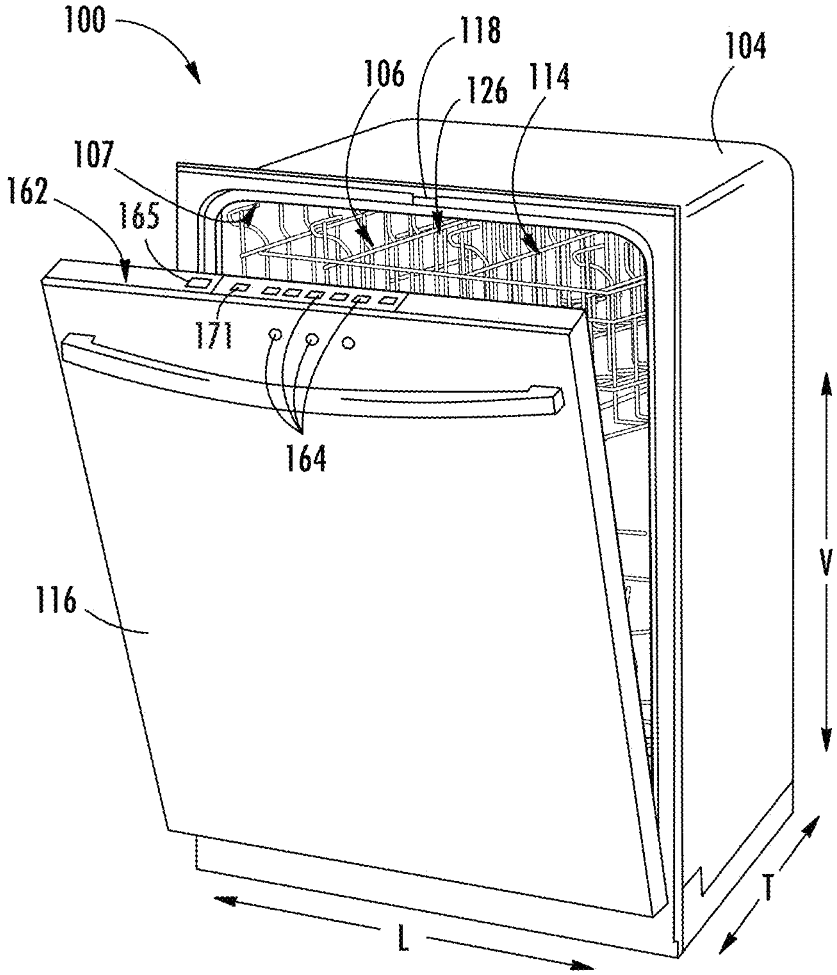
FIG. 2 provides a perspective view of a dishwashing appliance with a door in an intermediate position according to one or more exemplary embodiments of the present subject matter.
Figure 3:
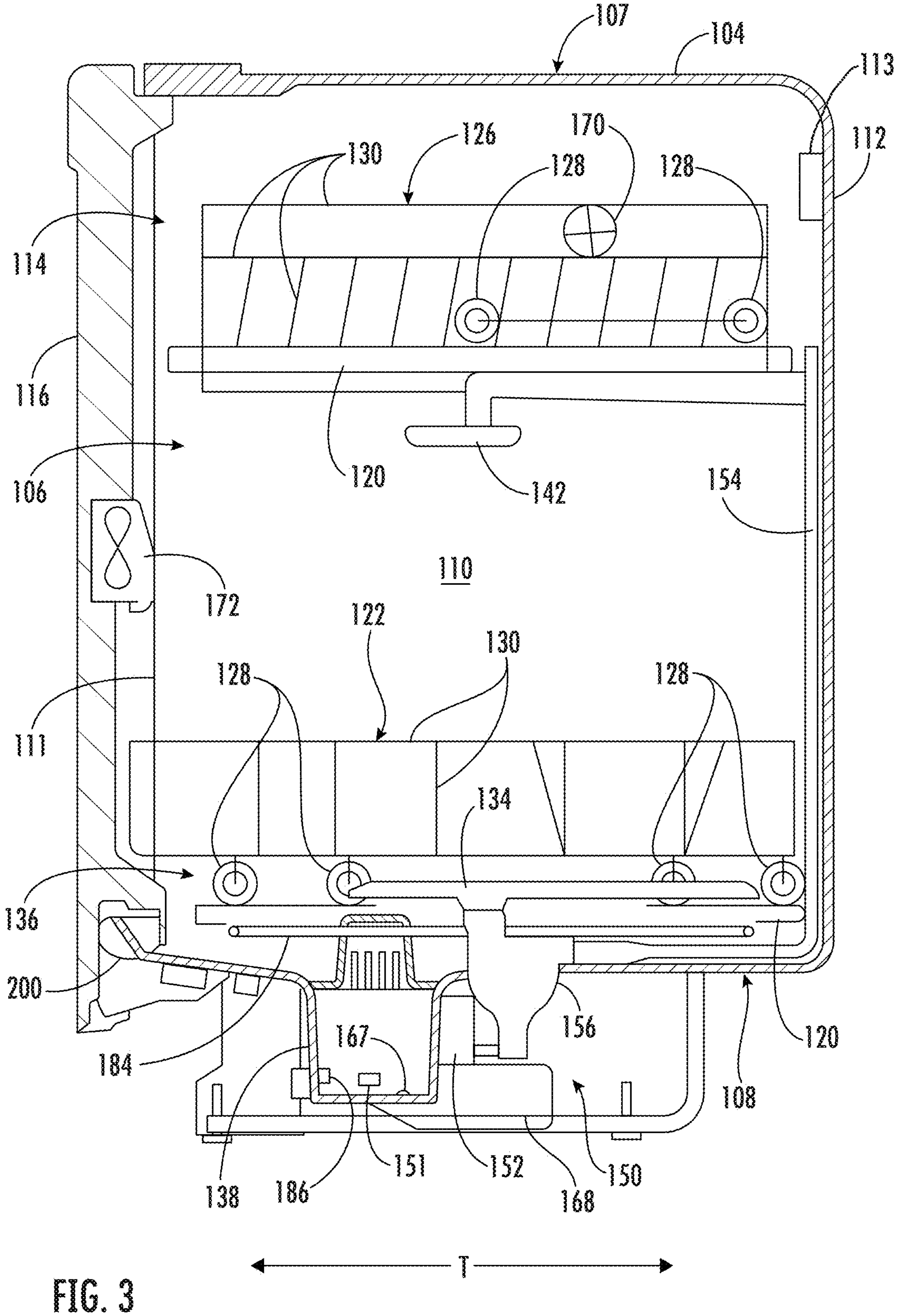
FIG. 3 provides a side, cross section view of a dishwashing appliance, such as the dishwashing appliance of FIG. 1 or FIG. 2, according to one or more exemplary embodiments of the present subject matter.

Turning now to the figures, FIGS. 1 through 3 depict a dishwashing appliance 100 that may be configured according to one or more exemplary aspects of the present subject matter. Generally, dishwashing appliance 100 defines a vertical direction V, a lateral direction L, and a transverse direction T. Each of the vertical direction V, lateral direction L, and transverse direction T are mutually perpendicular to one another and form an orthogonal direction system. The dishwashing appliance 100 may include a tub 104 that defines a wash chamber 106 therein. As shown in FIG. 3, tub 104 extends between a top 107 and a bottom 108 along the vertical direction V, between a pair of side walls 110 along the lateral direction L, and between a front side 111 and a rear side 112 along the transverse direction T.

Figure 7:
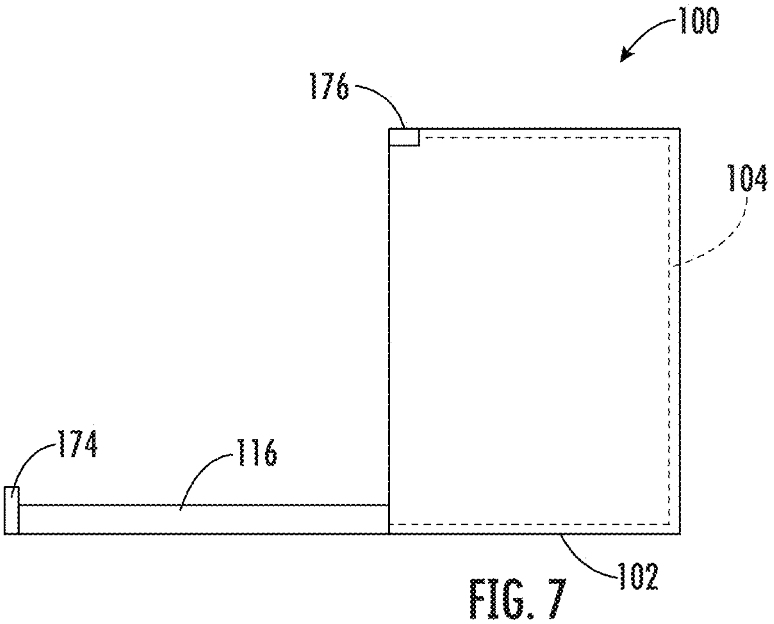
FIG. 7 provides a schematic elevation view of the exemplary dishwashing appliance of FIG. 1 or FIG. 2, wherein the door is in an opened position.

In some embodiments, the tub 104 includes a front opening 114 at the front side 111. Additionally, in some embodiments, the dishwashing appliance 100 includes a door 116 at the front opening 114. The door 116 may, for example, be coupled to the tub 104 by a hinge 200 at its bottom for movement between a normally closed vertical position (FIGS. 1 and 3), wherein the wash chamber 106 is sealed shut for washing operation, and an open position (FIG. 7) for loading and unloading of articles from dishwashing appliance 100. A door closure mechanism or assembly 118, e.g., a latch, may be provided to lock and unlock door 116 for accessing and sealing wash chamber 106.

In exemplary embodiments, tub side walls 110 accommodate a plurality of rack assemblies. For instance, guide rails 120 may be mounted to side walls 110 for supporting a lower rack assembly 122 and an upper rack assembly 126. In some such embodiments, upper rack assembly 126 is positioned at a top portion of wash chamber 106 above lower rack assembly 122 along the vertical direction V.

Generally, each rack assembly 122, 126 may be adapted for movement between an extended loading position (not shown) in which the rack is substantially positioned outside the wash chamber 106, and a retracted position (FIG. 3) in which the rack is located inside the wash chamber 106. In some embodiments, movement is facilitated, for instance, by rollers 128 mounted onto rack assemblies 122, 126, respectively.

Although guide rails 120 and rollers 128 are illustrated herein as facilitating movement of the respective rack assemblies 122, 126, it should be appreciated that any suitable sliding mechanism or member may be used according to alternative embodiments.

In optional embodiments, some or all of the rack assemblies 122, 126 are fabricated into lattice structures including a plurality of wires or elongated members 130 (for clarity of illustration, not all elongated members making up rack assemblies 122, 126 are shown). In this regard, rack assemblies 122, 126 are generally configured for supporting articles within wash chamber 106 while allowing a flow of wash liquid to reach and impinge on those articles (e.g., during a cleaning or rinsing phase of the wash cycle). According to additional or alternative embodiments, a silverware basket (not shown) may be removably attached to a rack assembly (e.g., lower rack assembly 122), for placement of silverware, utensils, and the like, that are otherwise too small to be accommodated by the rack assembly.

Generally, dishwashing appliance 100 includes one or more spray assemblies for urging a flow of fluid (e.g., wash liquid) onto the articles placed within wash chamber 106. In exemplary embodiments, dishwashing appliance 100 includes a lower spray arm assembly 134 disposed in a lower region 136 of wash chamber 106 and above a sump 138 so as to rotate in relatively close proximity to lower rack assembly 122. In this regard, lower spray arm assembly 134 may generally be configured for urging a flow of wash liquid up through lower rack assembly 122.

In some embodiments, an upper spray assembly 142 is located proximate to and, e.g., below, upper rack assembly 126 along the vertical direction V. In this manner, upper spray assembly 142 may be generally configured for urging of wash liquid up through upper rack assembly 126.

The various spray assemblies and manifolds described herein may be part of a fluid distribution system or fluid circulation assembly 150 for circulating wash liquid in tub 104. In certain embodiments, fluid circulation assembly 150 includes a circulation pump 152 for circulating wash liquid in tub 104. Circulation pump 152 may be mounted to sump 138 and in fluid communication with the sump 138 through a circulation outlet 151 from the sump 138.

When assembled, circulation pump 152 may be in fluid communication with an external water supply line (not shown) and sump 138. A water inlet valve (not shown) can be positioned between the external water supply line and circulation pump 152 (e.g., to selectively allow water to flow from the external water supply line to circulation pump 152). Additionally or alternatively, water inlet valve can be positioned between the external water supply line and sump 138 (e.g., to selectively allow water to flow from the external water supply line to sump 138). During use, the water inlet valve may be selectively controlled to open to allow the flow of water into dishwashing appliance 100 and may be selectively controlled to close and thereby cease the flow of water into dishwashing appliance 100. Further, fluid circulation assembly 150 may include one or more fluid conduits or circulation piping for directing wash fluid from circulation pump 152 to the various spray assemblies and manifolds. In exemplary embodiments, such as that shown in FIG. 3, a primary supply conduit 154 extends from circulation pump 152, along rear side 112 of tub 104 along the vertical direction V to supply wash liquid throughout wash chamber 106.

In optional embodiments, circulation pump 152 urges or pumps wash liquid to a diverter 156 (FIG. 3). In some such embodiments, diverter 156 is positioned within sump 138 of dishwashing appliance 100). Diverter 156 may include a diverter disk (not shown) disposed within a diverter chamber 158 for selectively distributing the wash liquid to the spray assemblies 134, 142, or other spray manifolds or assemblies. For instance, the diverter disk may have at least one aperture configured to align with one or more outlet ports (not shown) at the top of diverter chamber 158. In this manner, the diverter disk may be selectively rotated to provide wash liquid to the desired spray device(s).

In exemplary embodiments, diverter 156 is configured for selectively distributing the flow of wash liquid from circulation pump 152 to various fluid supply conduits (only some of which are illustrated in FIG. 3 for clarity). In certain embodiments, diverter 156 includes two or more outlet ports (not shown) for supplying wash liquid to a first conduit for rotating lower spray arm assembly 134 and a second conduit for supplying upper spray assembly 142 (e.g., supply conduit 154). Additional embodiments may also include one or more additional conduits, e.g., a third conduit for spraying an auxiliary rack such as a silverware rack, etc.

In some embodiments, a supply conduit 154 is used to supply wash liquid to one or more spray assemblies (e.g., to upper spray assembly 142). It should be appreciated, however, that according to alternative embodiments, any other suitable plumbing configuration may be used to supply wash liquid throughout the various spray manifolds and assemblies described herein. For instance, according to another exemplary embodiment, supply conduit 154 could be used to provide wash liquid to lower spray arm assembly 134 and a dedicated secondary supply conduit (not shown) could be utilized to provide wash liquid to upper spray assembly 142. Other plumbing configurations may be used for providing wash liquid to the various spray devices and manifolds at any location within dishwashing appliance 100.

Each spray assembly 134 and 142, or other spray device as may be included in dishwashing appliance 100, may include an arrangement of discharge ports or orifices for directing wash liquid received from circulation pump 152 onto dishes or other articles located in wash chamber 106. The arrangement of the discharge ports, also referred to as jets, apertures, or orifices, may provide a rotational force by virtue of wash liquid flowing through the discharge ports. Alternatively, spray assemblies 134, 142 may be motor-driven, or may operate using any other suitable drive mechanism. Spray manifolds and assemblies may also be stationary. The resultant movement of the spray assemblies 134, 142 and the spray from fixed manifolds provides coverage of dishes and other dishwasher contents with a washing spray. Other configurations of spray assemblies may be used as well. For instance, dishwashing appliance 100 may have additional spray assemblies for cleaning silverware, for scouring casserole dishes, for spraying pots and pans, for cleaning bottles, etc.

Drainage of soiled wash liquid within sump 138 may be provided, for instance, by a drain pump 168 (e.g., during or as part of a drain phase). In particular, wash liquid may exit sump 138 through a drain outlet 167 and may flow through a drain conduit or directly to the drain pump 168. Thus, drain pump 168 is downstream of sump 138 and facilitates drainage of the soiled wash liquid by urging or pumping the wash liquid to a drain line external to dishwashing appliance 100.

In some embodiments, a filter assembly may be provided, e.g., in the sump 138 and/or at a top entrance into the sump 138, e.g., to filter fluid to circulation assembly 150 and/or drain pump 168. Generally, the filter assembly removes soiled particles from the liquid that flows to the sump 138 from the wash chamber 106 during operation of dishwashing appliance 100. In exemplary embodiments, the filter assembly may include both a first filter (also referred to as a "coarse filter") and a second filter (also referred to as a "fine filter").

Although a separate circulation pump 152 and drain pump 168 are described herein, it is understood that other suitable pump configurations (e.g., using only a single pump for both recirculation and draining) may be provided.

The dishwashing appliance 100 may further include a heating element 184, such as a resistance heating element, positioned in or near the sump 138. For example, the heating element 184 may be positioned "near" the sump 138 in that the heating element 184 is disposed above the sump 138 and within the lower region 136 of wash chamber 106, such as below the lower spray arm 134 and/or below the lower rack assembly 122. The heating element 184 may be positioned and configured to heat liquid in the sump 138, such as for a heated wash phase, and/or to heat air within the wash chamber 106, such as for drying articles during a dry phase.

Dishwashing appliance 100 may also include ventilation features, e.g., to promote improved, e.g., more rapid, drying of articles therein after the wash and rinse phases. For example, one or more vents 170 may be provided in the tub 104 for introducing relatively dry air from outside of the tub 104 into the wash chamber 106 and/or for removing relatively humid air from the wash chamber 106 to the outside of the tub 104. In some embodiments, a fan 172 may be provided. The fan 172 may be operable to urge air through the wash chamber 106, such as to promote air circulation and/or ventilation within and through the wash chamber. Such air movement may increase the rate of evaporation of moisture from articles in the wash chamber 106 after a wash and/or rinse phase.

In certain embodiments, dishwashing appliance 100 includes a controller 160 configured to regulate operation of dishwashing appliance 100 (e.g., initiate one or more wash operations). Controller 160 may include one or more memory devices and one or more microprocessors, such as general or special purpose microprocessors operable to execute programming instructions or micro-control code associated with a wash operation or wash cycle that may include a pre-wash phase, a wash phase, a rinse phase, a drain phase, and/or a dry phase. The memory may represent random access memory such as DRAM, or read only memory such as ROM or FLASH. In some embodiments, the processor executes programming instructions stored in memory. The memory may be a separate component from the processor or may be included onboard within the processor. Alternatively, controller 160 may be constructed without using a microprocessor, e.g., using a combination of discrete analog or digital logic circuitry—such as switches, amplifiers, integrators, comparators, flip-flops, AND gates, and the like—to perform control functionality instead of relying upon software. It should be noted that controllers as disclosed herein are capable of and may be operable to perform any methods and associated method steps as disclosed herein.

Controller 160 may be positioned in a variety of locations throughout dishwashing appliance 100. In optional embodiments, controller 160 is located within a control panel area 162 of door 116 (FIG. 1). Input/output ("I/O") signals may be routed between the control system and various operational components of dishwashing appliance 100 along wiring harnesses that may be routed through the bottom of door 116. Typically, the controller 160 includes or is operatively coupled to a user interface panel 164 through which a user may select various operational features and modes and monitor progress of dishwashing appliance 100. In some embodiments, user interface panel 164 includes a general purpose I/O ("GPIO") device or functional block.

In exemplary embodiments, the user interface panel 164 includes a plurality of touch sensors. Touch sensors may be well known in the art and may include, sensors such as capacitive touch sensors, resistive touch sensors, ultrasonic touch sensors, infrared touch sensors, etc. For the sake of clarity and brevity the function and structure of the plurality of touch sensors are generally described herein. Particularly, as described herein, the plurality of touch sensors may be a plurality of capacitive touch sensors.

In some embodiments, the plurality of capacitive touch sensors are mounted below selected indicator zones that correspond to user inputs or other indicators on the user interface panel 164. The plurality of capacitive touch sensors are operable to detect user inputs on an overlay panel of the user interface panel 164. For example, the capacitive touch sensors may be configured for detecting a touch event when a user touches or taps a surface of the user interface panel 164 proximate the capacitive touch sensor. In particular the plurality of capacitive touch sensors can detect when a finger or another conductive material with a dielectric field different than air contacts or approaches the user interface panel 164 and can trigger, for example, signal, the controller 160 to direct or control the dishwashing appliance 100.

In additional or alternative embodiments, the user interface panel 164 includes input components, such as one or more of a variety of electrical, mechanical or electro-mechanical input devices including rotary dials, and push buttons. In further additional or alternative embodiments, user interface panel 164 includes a display component, such as a digital or analog display device designed to provide operational feedback to a user. When assembled, user interface panel 164 may be in operative communication with the controller 160 via one or more signal lines or shared communication busses.

Additionally, in some embodiments, for instance, as illustrated in FIG. 2, the control panel area 162 includes a microphone 165 (e.g., the second microphone) in operative communication with the controller 160. For example, in some embodiments, the microphone 165 is mounted to the control panel area 162 (e.g., within door 116) and positioned adjacent to the user interface panel 164. Thus, the microphone 165 may be operable for detecting audio signals emitted from the user interface panel 164. For instance, the microphone 165 is operable for detecting engagement sounds that may be emitted from the user interface panel 164 in response to an input being received on the user interface panel 164, e.g., when a touch event is detected via a capacitive touch sensor of the user interface panel 164.

For example, the "microphone" may include any suitable type of audio listening system or device positioned at any suitable location for recording audio signals. Thus, for example, the microphone 165 may be any suitable type of microphone such as a condenser microphone, piezoelectric microphone, ultrasonic microphone, etc. In addition, microphone 165 may be positioned at any suitable location and may output a signal, such as a voltage, to the controller 160 that is proportional to and/or indicative of the audio signal being recorded.

Additionally or alternatively, the dishwashing appliance 100 may also include an optical instrument 113 in operative communication with the controller 160. For example, in some embodiments, the optical instrument 113 may be positioned within the tub 104, and more particularly, positioned or attached to the tub 104 such as positioned or attached to the rear side 112 of the tub 104. Thus, the optical instrument 113 may be operable to record visual feedback of the door 116. For example, the "optical instrument" may include any suitable type of image capturing system or device positioned at any suitable location for recording visual feedback of the door 116. Thus, for example, optical instrument 113 may be any suitable type of optical instrument, for example, a camera, that may capture and record visual feedback, for example, images or video, of the door 116. As will be described in more detail below, the optical instrument 113 may be used in conjunction with a microphone (e.g., microphone 202) to determine an access position of the door 116.

Figure 5:
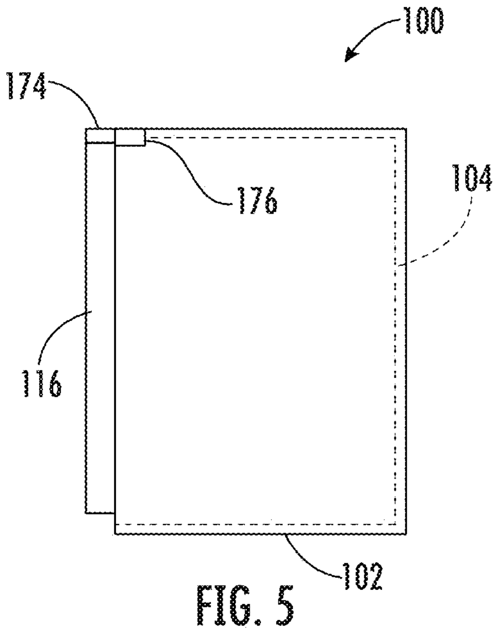
FIG. 5 provides a schematic elevation view of the exemplary dishwashing appliance of FIG. 1 or FIG. 2, wherein the door is in a closed position.

Additionally or alternatively, the dishwashing appliance 100 may include a sensor assembly 161 that is in operative communication with the controller 160. For example, in some embodiments, the sensor assembly 161 may be attached to cabinet 102 (e.g., directly or alternatively, indirectly) and can, thus, move therewith. In particular, sensor assembly 161 is provided on or in communication with door 116. Generally, sensor assembly 161 may be configured to detect one or more rotational positions (e.g., predetermined positional angles) of door 116. Specifically, sensor assembly 161 may be configured to detect the positional angle of door about its axis of rotation. Optionally, sensor assembly 161 may detect one or more predetermined angular positions (e.g., positional angles) of door 116. For instance, sensor assembly 161 may be in communication (e.g., electric or wireless communication) with controller 160 to generate one or more signals indicating the positional angle that door 116 is currently in or has recently reached. Sensor assembly 161 may thus detect or determine if door 116 is in the closed position (e.g., FIG. 5), fully opened position (e.g., FIG. 7), or one or more intermediate positions (e.g., a partially opened position—FIG. 6) between the closed position and the fully opened position.

The "sensor assembly" may include any suitably type of rotational position system or device positioned at or proximate to the door 116. Thus, for example, the sensor assembly 161 includes one or more sensors such as a infrared sensor, an accelerometer, a wave emission sensor, etc. In addition, the sensor assembly 161 may be positioned at any suitable location and may output a signal, such as a voltage, to the controller 160 that is proportional to or indicative of the rotational position of the door 116 being detected.

The door closure assembly 118 may serve to selectively hold door 116 closed and may include a separate latch 174 (e.g., proximal to or mounted at a top portion of door 116) and catch 176 (e.g., disposed at or above top 107). As shown, latch 174 may extend rearward, such as from an inner or rearward-facing surface of door 116 and toward the cabinet 102. When closed or otherwise in the closed position (e.g., fully closed position-FIG. 5), latch 174 may be received within a cavity or catch 176 of cabinet 102 (e.g., such that latch is locked within cabinet 102).

In some embodiments, latch assembly 118 is in operative (e.g., electrical or wireless) communication with controller 160. Controller 160 may be configured to detect door 116 in the closed position, such as through an include mechanical or electrical (e.g., magnetic) reed switch that transmits a closed door 116 signal (e.g., to controller 160) in response to engagement therewith by the door 116. In some such embodiments, closure assembly 118 includes a first contact mounted to tub 104 and a second contact mounted to door 116 (e.g., to rotate therewith). For instance, the first contact may provide a rail or catch (e.g., catch 176) that receives or contacts the second contact (e.g., latch 174) when door 116 is in the closed position or a partially open (e.g., vent) position.

The dishwashing appliance 100 may also include a temperature sensor 186 in operative communication with the controller 160. For example, in some embodiments, the temperature sensor 186 may be located in the sump 138 and may thereby be operable to measure a temperature of a liquid, e.g., wash liquid, within the sump 138. For example, the "temperature sensor" may include any suitable type of temperature measuring system or device positioned at any suitable location for measuring the desired temperature. Thus, for example, temperature sensor 186 may be any suitable type of temperature sensor, such as a thermistor, a thermocouple, a resistance temperature detector, a semiconductor-based integrated circuit temperature sensor, etc. In addition, temperature sensor 186 may be positioned at any suitable location and may output a signal, such as a voltage, to the controller 160 that is proportional to or indicative of the temperature being measured. Although exemplary positioning of the temperature sensor 186 is described herein and depicted in FIG. 3, it should be appreciated that dishwashing appliance 100 may include any other suitable number, type, and position of temperature, humidity, and/or other sensors as well as or instead of the exemplary temperature sensor 186 according to alternative embodiments.

It should be appreciated that the invention is not limited to any particular style, model, or configuration of dishwashing appliance 100. The exemplary embodiments depicted in FIGS. 1 through 3 are for illustrative purposes only. For instance, different locations may be provided for control panel area 162 (e.g., on the front of the door 116 as illustrated in FIG. 1 or on the top of the door 116 as illustrated in FIG. 2, or other locations as well), different configurations may be provided for rack assemblies 122, 126, different spray assemblies 134, 142 and spray manifold configurations may be used, different sensors may be used, and other differences may be applied while remaining within the scope of the present disclosure.

Figure 4:
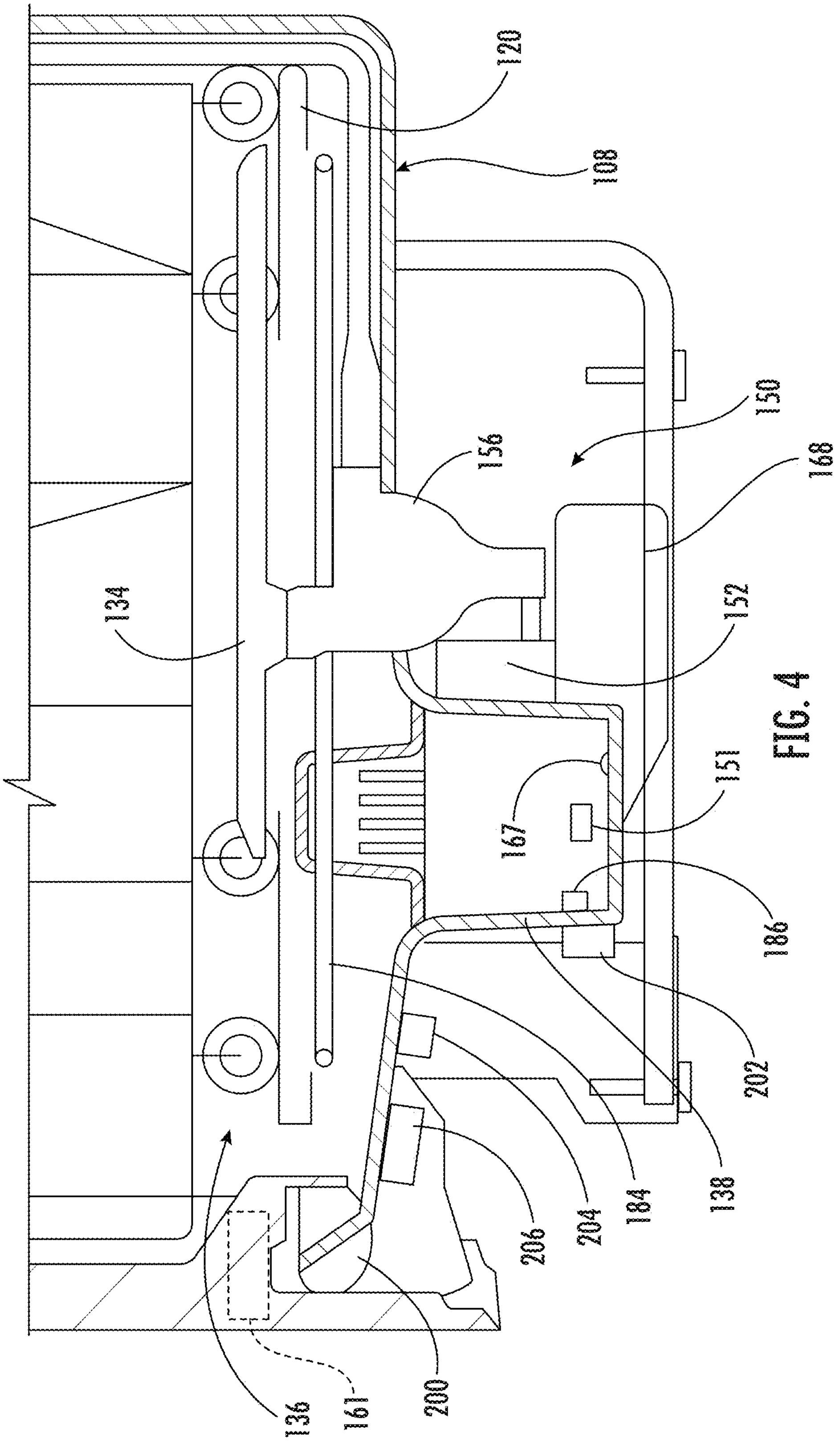
FIG. 4 provides an enlarged view of a portion of the exemplary dishwashing appliance of FIG. 3.

In some embodiments, e.g., as illustrated in FIG. 4, the dishwashing appliance 100 may include a microphone 202 (e.g., a first microphone separate from or in addition to microphone 165, regardless of the presence/absence of any other microphone). The microphone 202 may be in communication with a controller, such as controller 160. The microphone 202 may be mounted to the dishwashing appliance 100 in any suitable location, such as outside of the wash chamber 106, e.g., on one of the walls of the tub 104, such as on an external surface (e.g., opposite the wash chamber 106) of the tub 104. For example, in some embodiments, such as the exemplary embodiment illustrated in FIG. 4, the microphone 202 may be mounted to the sump 138. The "microphone" may include any suitable type of audio listening system or device positioned at any suitable location for recording audio signals. Thus, for example, the microphone 202 may be any suitable type of microphone such as a condenser microphone, piezoelectric microphone, ultrasonic microphone, etc.

In some embodiments, the microphone 202 is capable of detecting audio signals from one or more components of the dishwashing appliance 100. For instance, the microphone 202 may be capable of detecting audio signals indicative of an engagement sound that may be emitted from a speaker 171, such as a piezoelectric speaker, a multi-tone speaker, etc., of the user interface panel 164 of the dishwashing appliance 100. As used herein an "engagement sound" may generally refer to audio, for example, a ding, chime, or any other suitable sound, that is emitted from the user interface panel 164 in response to an input being received on the user interface panel 164. In general, engagement sounds may be used to alert or notify the user of the dishwashing appliance 100 that an input indicative of an operational setting for the dishwashing appliance 100 has been received. An engagement sound may be emitted from the user interface panel 164 in response to a touch event being detected by a capacitive touch sensor of the user interface panel 164.

In some cases, a user of the dishwashing appliance 100 may accidentally interact with the user interface panel 164 when the door 116 of the dishwashing appliance 100 is in a loading position, e.g., any suitable position of the door 116 wherein the wash chamber 106 is accessible. In some embodiments, the loading position of the door 116 may correspond to the fully opened position (e.g., FIG. 7) or one or more intermediate positions (e.g., the partially opened position-FIG. 6) between the closed positioned and the fully open position.

The accidental interaction with the user interface panel 164 when the door 116 is in the loading position may trigger the user interface panel 164 to detect an unwanted touch event, e.g., a touch event detected by the user interface panel 164 when the door 116 is in the loading position. For instance, an unwanted touch event may be detected in response to a user, for example, a body part such as a knee, shin, stomach, etc. of the user, touching or manipulating the user interface panel 164 and trigger when the door is in the loading position. The unwanted touch event may result in changes or adjustments to previously set operational settings to the dishwashing appliance 100.

Figure 8:
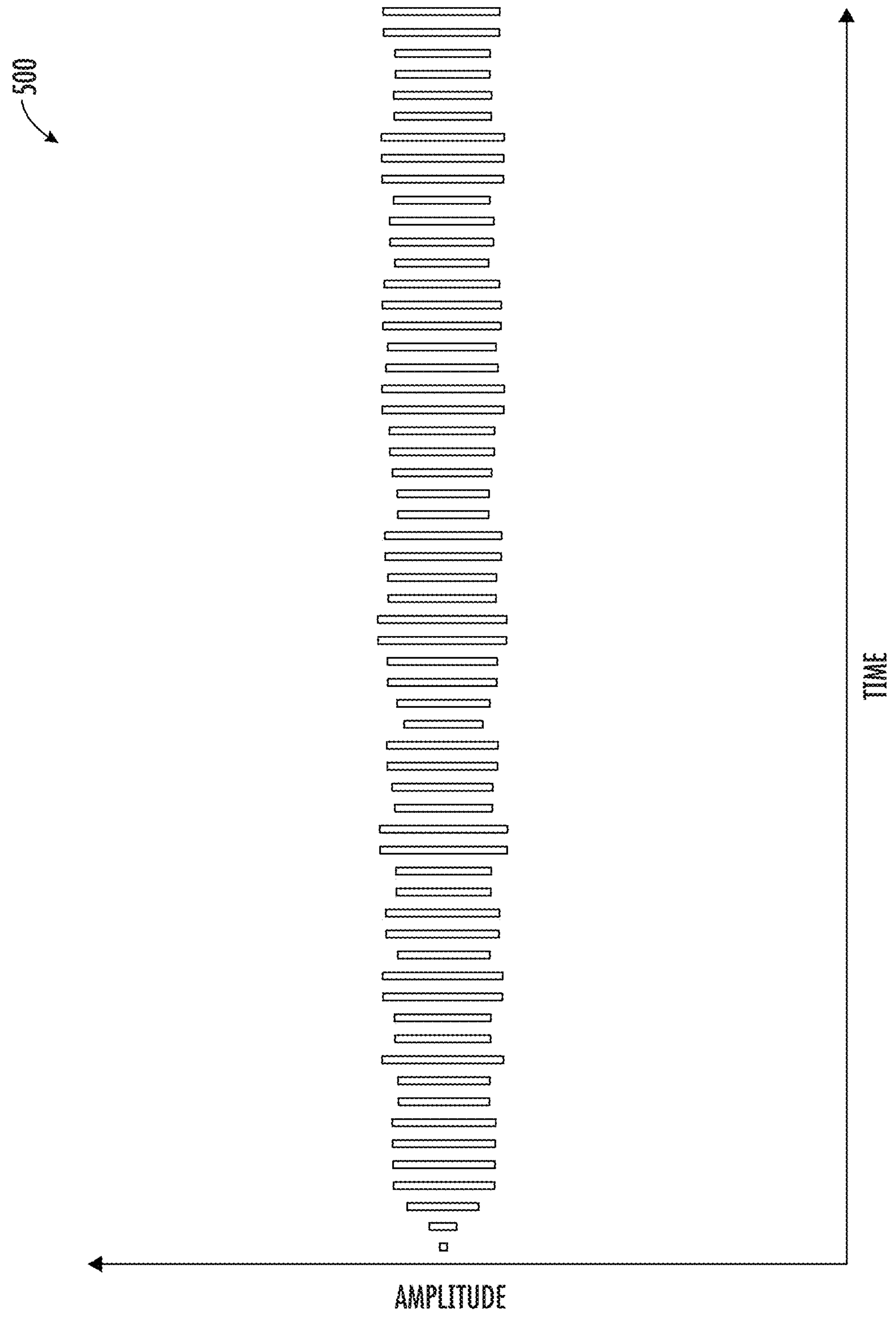
FIG. 8 illustrates an audio graph of a dishwashing appliance according to one or more exemplary embodiments of the present subject matter.
Figure 9:
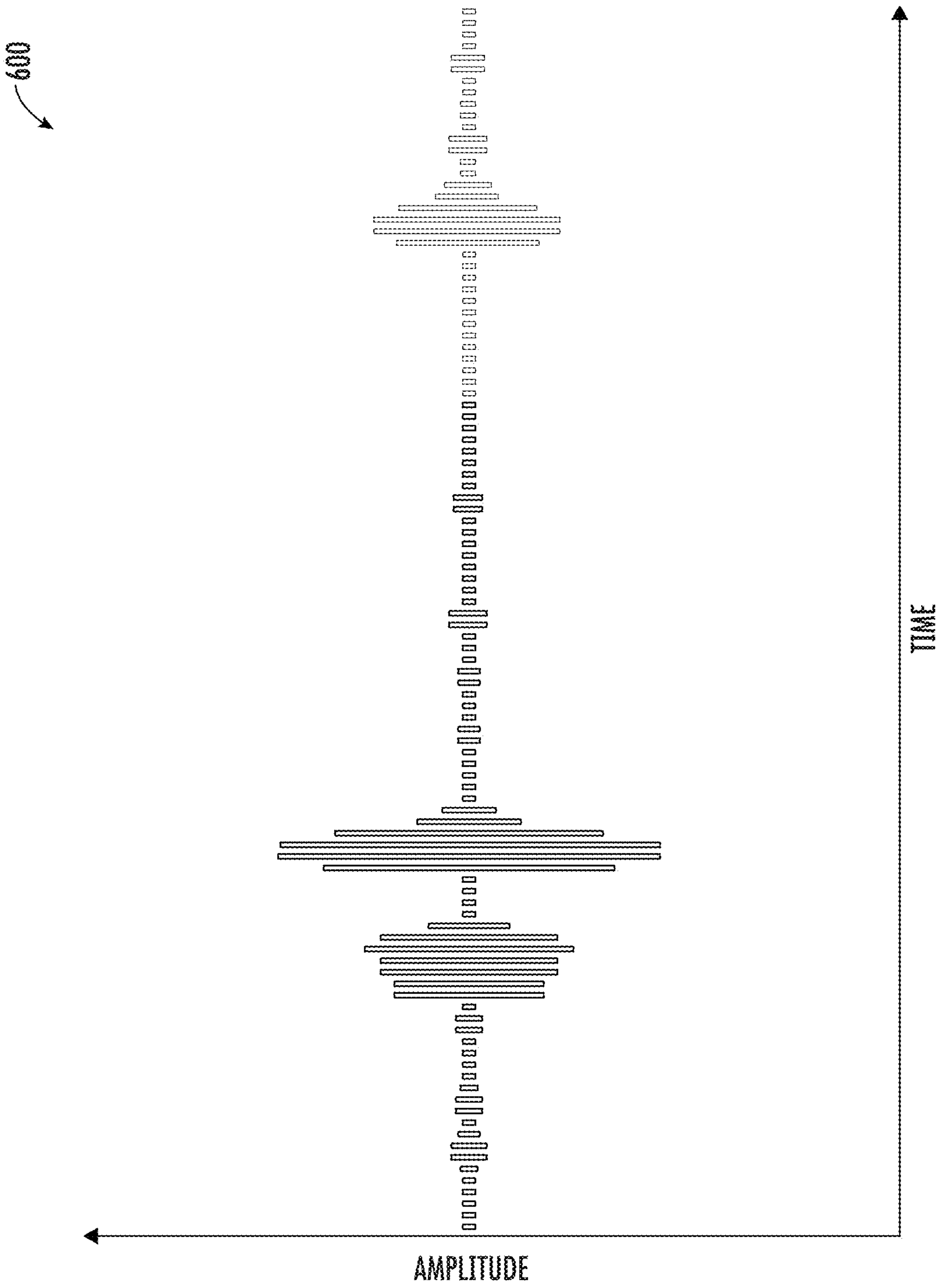
FIG. 9 illustrates an additional audio graph of a dishwashing appliance according to one or more exemplary embodiments of the present subject matter.

Referring now to FIGS. 8 and 9, illustrations of audio graphs that include audio signals recorded with the microphone 202 when one or more touch events of the user interface panel 164 have been detected are provided. Specifically, FIG. 8 depicts a first audio graph 500 wherein the door 116 is in the closed position and one or more touch events of the user interface panel 164 have been detected. FIG. 9 depicts a second audio graph 600 wherein the door 116 is in the loading position and one or more touch events of the user interface panel 164 have been detected.

As shown graphically by the first audio graph 500, when the door 116 is in the closed position, the audio signal of the first audio graph 500 may have no notable changes when touch events are detected, and more particularly, when the engagement sounds are emitted from the user interface panel 164 in response to the touch events being detected. For instance, characteristics of the audio signal of the first audio graph 500, such as the frequency of the audio signal or the amplitude of the audio signal may remain relatively constant (e.g., within a predetermined range or magnitude). In other words, when the door is in the closed position, the microphone 202 may not pick up, or may not be capable of discerning, an engagement sound that may be emitted from the user interface panel 164 in response to the touch event being detected.

Figure 6:
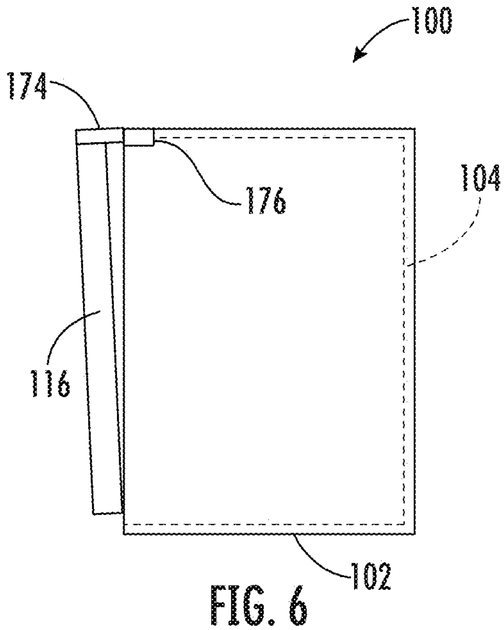
FIG. 6 provides a schematic elevation view of the exemplary dishwashing appliance of FIG. 1 or FIG. 2, wherein the door is in an intermediate position.

As shown graphically by the second audio graph 600, when the door 116 is in the loading position, the audio signal of the second audio graph 600 may have a notable changes when touch events are detected, and more particularly, when the engagement sounds are emitted from the user interface panel 164 in response to the touch events being detected. For example, characteristics of the audio signal of the second audio graph 600, such as the frequency of the audio signal or the amplitude of the audio signal may have significant variation such that the engagement sound may be discerned within the recorded audio signal. In other words, when the door is in the loading position, the microphone 202 may pick up, or may be capable of discerning, an engagement sound that may be emitted from the user interface panel. For instance, as illustrated in FIG. 6, it may be seen that three instances of an engagement sound may be discerned within the audio signal of the second audio graph 600.

Figure 10:
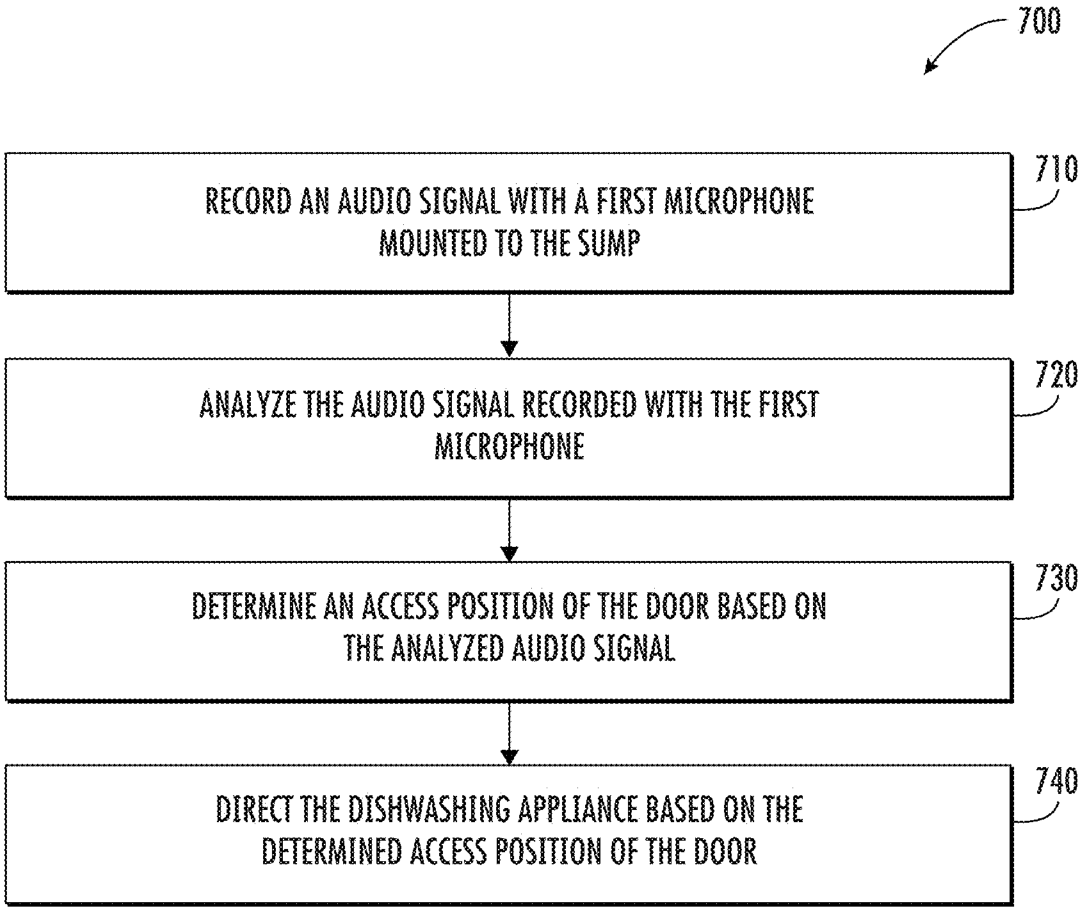
FIG. 10 provides a flow diagram of an exemplary method of operating a dishwashing appliance according to one or more embodiments of the present subject matter.

Turning now to FIG. 10, embodiments of the present subject matter may also include methods of operating a dishwashing appliance, such as the exemplary method 700 illustrated in FIG. 10. For example, such methods may be used with dishwashing appliance 100, but are not limited to this particular dishwashing appliance. Accordingly, it is to be understood that reference numerals for dishwashing appliance 100 and components thereof are included in the description of method 700 solely for purposes of illustration and by way of example only.

In some embodiments, the method 700 includes a step 710 of recording an audio signal with the microphone 202, mounted to the sump 138 of dishwashing appliance 100. As would be understood by those of ordinary skill in the art, the step 710 of recording an audio signal with the microphone 202 may include digitizing the audio, for example, audio that may be emitted from the speaker 171 of the user interface panel 164, into a digital signal. The audio signal recorded may correspond to the digitized audio, e.g., the digital signal. Further, the step 710 may include continuously recording the audio signal with the microphone 202, wherein continuously recording the audio signal with the microphone 202 may include recording the audio signal with the microphone 202 before, during, or after operation of the dishwashing appliance 100.

In some embodiments, the method 700 includes a step 720 of analyzing the audio signal recorded with the microphone 202. In some embodiments, the step 720 of analyzing the audio signal includes identifying audio characteristics (e.g., frequency, amplitude, wavelength, timbre, recorded soundwave graph shapes, attack-decay-sustain-release (ADSR) envelope, etc.) within the audio signal recorded with the microphone 202. For instance, using one or more known filters, programs, or algorithms applied to the recorded audio signal of 710, one or more distinguishing audio characteristics may be determined, selected, or graphed (e.g., to represent attributes of the recorded audio signal). Such characteristics may then be compared to one or more predetermined, preselected, or previously graphed baseline characteristics (e.g., amplitude or frequency-including magnitude or change therein) that correspond to a predicted engagement sound. As an example, from the comparison, it may be determined whether the recorded audio signal substantially matches the predicted engagement sound (e.g., to identify if the recorded audio signal is indicative of an engagement sound).

In turn, identifying the audio characteristics within the audio signal recorded with the microphone 202 may include identifying audio characteristics indicative of an engagement sound from the user interface panel 164 within the recorded audio signal. As described above, an engagement sound from the user interface panel 164 may be audio, for example, a ding or a chime, emitted from the speaker 171 of the user interface panel 164 in response to an input being received via the user interface panel 164, for example, an input received in response to a touch event being detected by capacitive touch sensors of the user interface panel 164.

Further, in some embodiments, the method 700 includes a step 730 of determining an access position of the door 116 based on the analyzed audio signal. For instance, based on the presence of, or lack thereof, an audio characteristic indicative of the engagement sound within the analyzed audio signal, the access position of the door 116 may be determined. For example, based on the audio characteristic indicative of the engagement sound from the user interface panel 164 being identified, e.g., such as described above with reference to step 720, it may be determined that the access position of the door 116 is a loading position. Particularly, to determine that the access position of the door 116 is the loading position, after the audio characteristics of the engagement sound from the user interface panel 164 have been identified, such audio characteristic may then further be compared to one or more predetermined, preselected, or previously graphed baseline characteristics that correspond to a predicted access position of the door 116. As an example, from the comparison, it may be determined whether the audio characteristics of the recorded audio signal substantially match the predicted access position of the door 116. For instance, during the analysis of the audio signal recorded with the microphone 202 if audio characteristics indicative of engagement sounds emitted from the user interface panel 164 are identified, it may be known that the door 116 of the dishwashing appliance 100 is in a loading position as the audio characteristics would not be discernible, when the door 116 is in the closed position, e.g., as described in more detail above with regards to FIGS. 8 and 9.

In some embodiments, in response to the access position of the door 116 being determined to be the loading position, for example, at step 730, the step 740 of directing the dishwashing appliance 100 may include a step of resetting a settings profile stored within a memory of the controller 160 to a previous settings profile. In other words, when it is determined that the access position of the door 116 is the loading position, inputs received in response to touch events detected on the user interface panel 164, e.g., unwanted touch events, may not change the settings profile of the dishwashing appliance 100. In this regard, when the door 116 of the dishwashing appliance 100 is in the loading position, the functionality of the user interface panel 164 may be limited or restricted such that unwanted changes to the settings profile of the dishwashing appliance 100 may be mitigated or eliminated.

Further, the method 700 may include a step of recording the audio signal with the microphone 165, wherein the microphone 165 may be mounted to the door 116 and positioned adjacent to the user interface panel 164. The method 700 may also include a step of analyzing the audio signal recorded with the microphone 165. In such embodiments the step 730 of determining the access position of the door 116 may be based on the analyzed audio signal recorded with the microphone 202 and the analyzed audio signal recorded with the microphone 165.

As should be understood, the audio signal recorded with the microphone 165 may always include audio characteristics indicative of the engagement sounds emitted from the user interface panel 164. Particularly, due to the positioning of the microphone 165 relative to the user interface panel 164, the audio signal recorded with the microphone 165 may include audio characteristics indicative of engagement sounds emitted from the user interface panel 164, for instance, when the door 116 is in the closed position or when the door 116 is in the loading position.

In this regard, the analyzed audio signal recorded with the microphone 202 can be compared to the analyzed audio signal recorded with the microphone 165 to determine the access position of the door 116. For example, if audio characteristics indicative of engagement sounds are identified in both the audio signal recorded with the microphone 202 and the audio signal recorded with the microphone 165, it may be determined that the access position of the door 116 is a loading position. As another example, if the audio characteristics indicative of the engagement sounds are only identified in the audio signal recorded with the microphone 165 and not in the audio signal recorded with the microphone 202, it may be determined that the access position of the door 116 is a closed position.

In this regard, based on the access position of the door 116, the controller 160 may direct the dishwashing appliance 100. For example, directing the dishwashing appliance 100 may include storing within the memory of the controller 160 operational settings and initiating a wash cycle based on the operational settings stored within the memory of the controller 160. Additionally, the method 700 may include a step of recording visual feedback with the optical instrument 113, wherein the optical instrument 113 is mounted within the tub 104 of the dishwashing appliance 100. The step of recording visual feedback with the optical instrument 113 may include obtaining one or more images of the door 116. Although the term "image" is used herein, it should be appreciated that according to exemplary embodiments, optical instrument 113 may take any suitable number or sequence of two-dimensional images, videos, or other visual representations of the door 116. For example, the one or more images may include a video feed or series of sequential static images obtained by optical instrument 113 that may be transmitted to the controller 160 (e.g., as a data signal) for analysis or other manipulation. These obtained images may vary in number, frequency, angle, field-of-view, resolution, detail, etc.

Further, the method 700 may also include a step of analyzing the visual feedback, e.g., images, recorded with the optical instrument 113 to determine, at least in part, the access position of the door 116. In such embodiments the step 730 of determining the access position of the door 116 may be based on the analyzed audio signal recorded with the microphone 202 and the analyzed visual feedback recorded with the optical instrument 113.

In such embodiments, the optical instrument 113 may be positioned within the tub 104 of the dishwashing appliance 100 such that it may continuously monitor a position of the door 116 relative to the cabinet 102. For instance, the optical instrument 113 may be capable of determining if the door 116 is latched to, or unlatched from, the cabinet 102 of the dishwashing appliance 100. In this regard, the analyzed visual feedback from the door 116 may be used in conjunction with the analyzed audio signal recorded with the first microphone to determine the access position of the door 116.

According to exemplary embodiments, this image analysis may use any suitable image processing technique, image recognition process, etc. As used herein, the terms "image analysis" and the like may be used generally to refer to any suitable method of observation, analysis, image decomposition, feature extraction, image classification, etc. of one or more images, videos, or other visual representations of an object. As explained in more detail below, this image analysis may include the implementation of image processing techniques, image recognition techniques, or any suitable combination thereof. In this regard, the image analysis may use any suitable image analysis software or algorithm to constantly or periodically monitor the door 116. It should be appreciated that this image analysis or processing may be performed locally (e.g., by controller 160 or remotely) (e.g., by offloading image data to a remote server or network).

Specifically, the analysis of the one or more images may include implementation an image processing algorithm. As used herein, the terms "image processing" and the like are generally intended to refer to any suitable methods or algorithms for analyzing images that do not rely on artificial intelligence or machine learning techniques (e.g., in contrast to the machine learning image recognition processes described below). For example, the image processing algorithm may rely on image differentiation, e.g., such as a pixel-by-pixel comparison of two sequential images. This comparison may help identify substantial differences between the sequentially obtained images, e.g., to identify movement, the presence of a particular object, the existence of a certain condition, etc. For example, one or more reference images may be obtained when a particular condition exists, and these references images may be stored for future comparison with images obtained during appliance operation. Similarities and/or differences between the reference image and the obtained image may be used to extract useful information for improving appliance performance.

According to exemplary embodiments, image processing may include blur detection algorithms that are generally intended to compute, measure, or otherwise determine the amount of blur in an image. For example, these blur detection algorithms may rely on focus measure operators, the Fast Fourier Transform along with examination of the frequency distributions, determining the variance of a Laplacian operator, or any other methods of blur detection known by those having ordinary skill in the art. In addition, or alternatively, the image processing algorithms may use other suitable techniques for recognizing or identifying items or objects, such as edge matching or detection, divide-and-conquer searching, greyscale matching, histograms of receptive field responses, or another suitable routine (e.g., executed at the controller 160 based on one or more captured images from one or more optical instruments such as the optical instrument 113). Other image processing techniques are possible and within the scope of the present subject matter. The processing algorithm may further include measures for isolating or eliminating noise in the image comparison, e.g., due to image resolution, data transmission errors, inconsistent lighting, or other imaging errors. By eliminating such noise, the image processing algorithms may improve accurate object detection, avoid erroneous object detection, and isolate the important object, region, or pattern within an image.

In addition to the image processing techniques described above, the image analysis may include utilizing artificial intelligence ("AI"), such as a machine learning image recognition process, a neural network classification module, any other suitable artificial intelligence (AI) technique, and/or any other suitable image analysis techniques, examples of which will be described in more detail below. Moreover, each of the exemplary image analysis or evaluation processes described below may be used independently, collectively, or interchangeably to extract detailed information regarding the images being analyzed to facilitate performance of one or more methods described herein or to otherwise improve appliance operation. According to exemplary embodiments, any suitable number and combination of image processing, image recognition, or other image analysis techniques may be used to obtain an accurate analysis of the obtained images.

In this regard, the image recognition process may use any suitable artificial intelligence technique, for example, any suitable machine learning technique, or for example, any suitable deep learning technique. According to an exemplary embodiment, the image recognition process may include the implementation of a form of image recognition called region based convolutional neural network ("R-CNN") image recognition. Generally speaking, R-CNN may include taking an input image and extracting region proposals that include a potential object or region of an image. In this regard, a "region proposal" may be one or more regions in an image that could belong to a particular object or may include adjacent regions that share common pixel characteristics. A convolutional neural network is then used to compute features from the region proposals and the extracted features will then be used to determine a classification for each particular region.

According to still other embodiments, an image segmentation process may be used along with the R-CNN image recognition. In general, image segmentation creates a pixel-based mask for each object in an image and provides a more detailed or granular understanding of the various objects within a given image. In this regard, instead of processing an entire image—i.e., a large collection of pixels, many of which might not contain useful information-image segmentation may involve dividing an image into segments (e.g., into groups of pixels containing similar attributes) that may be analyzed independently or in parallel to obtain a more detailed representation of the object or objects in an image. This may be referred to herein as "mask R-CNN" and the like, as opposed to a regular R-CNN architecture. For example, mask R-CNN may be based on fast R-CNN which is slightly different than R-CNN. For example, R-CNN first applies a convolutional neural network ("CNN") and then allocates it to zone recommendations on the covn5 property map instead of the initially split into zone recommendations. In addition, according to exemplary embodiments, standard CNN may be used to obtain, identify, or detect any other qualitative or quantitative data related to one or more objects or regions within the one or more images. In addition, a K-means algorithm may be used.

According to still other embodiments, the image recognition process may use any other suitable neural network process while remaining within the scope of the present subject matter. For example, the step of analyzing the one or more images may include using a deep belief network ("DBN") image recognition process. A DBN image recognition process may generally include stacking many individual unsupervised networks that use each network's hidden layer as the input for the next layer. According to still other embodiments, the step of analyzing one or more images may include the implementation of a deep neural network ("DNN") image recognition process, which generally includes the use of a neural network (computing systems inspired by the biological neural networks) with multiple layers between input and output. Other suitable image recognition processes, neural network processes, artificial intelligence analysis techniques, and combinations of the above described or other known methods may be used while remaining within the scope of the present subject matter.

In addition, it should be appreciated that various transfer techniques may be used but use of such techniques is not required. If using transfer techniques learning, a neural network architecture may be pretrained such as VGG16/VGG19/ResNet50 with a public dataset then the last layer may be retrained with an appliance specific dataset. In addition, or alternatively, the image recognition process may include detection of certain conditions based on comparison of initial conditions, may rely on image subtraction techniques, image stacking techniques, image concatenation, etc. For example, the subtracted image may be used to train a neural network with multiple classes for future comparison and image classification.

It should be appreciated that the machine learning image recognition models may be actively trained by the appliance with new images, may be supplied with training data from the manufacturer or from another remote source, or may be trained in any other suitable manner. For example, according to exemplary embodiments, this image recognition process relies at least in part on a neural network trained with a plurality of images of the appliance in different configurations, experiencing different conditions, or being interacted with in different manners. This training data may be stored locally or remotely and may be communicated to a remote server for training other appliances and models. According to exemplary embodiments, it should be appreciated that the machine learning models may include supervised and/or unsupervised models and methods. In this regard, for example, supervised machine learning methods (e.g., such as targeted machine learning) may help identify problems, anomalies, or other occurrences which have been identified and trained into the model. By contrast, unsupervised machine learning methods may be used to detect clusters of potential failures, similarities among data, event patterns, abnormal concentrations of a phenomenon, etc.

It should be appreciated that image processing and machine learning image recognition processes may be used together to facilitate improved image analysis, object detection, or to extract other useful qualitative or quantitative data or information from the one or more images that may be used to improve the operation or performance of the appliance. Indeed, the methods described herein may use any or all of these techniques interchangeably to improve image analysis process and facilitate improved appliance performance and consumer satisfaction. The image processing algorithms and machine learning image recognition processes described herein are only exemplary and are not intended to limit the scope of the present subject matter in any manner.

Further, in some embodiments, the method 700 may include a step of recording an angular position of the door 116 with the sensor assembly 161 of the dishwashing appliance 100. Recording the angular position of the door 116 may include detecting when door 116 is in the closed position (e.g., via a contact sensor, capacitive sensor, reed switch, etc.). Additionally or alternatively, sensor assembly 161 may include one or more discrete sensors (e.g., accelerometer, gyroscope, etc.) mounted on or in selective engagement with door 116 to detect the position of door 116 (e.g., in an open position, closed position, or intermediate position between a horizontal open position and a closed position). The method 700 may also include a step of analyzing the angular position of the door 116 recorded with the sensor assembly 161. In such embodiments the step 730 of determining the access position of the door 116 may be based on the analyzed audio signal recorded with the microphone 202 of the dishwashing appliance 100, and the analyzed angular position of the door 116 recorded with the sensor assembly 161.

Embodiments of the present subject matter may advantageously provide systems and methods of operating a dishwashing appliance. An audio listening device such as a microphone may advantageously be mounted outside of the wash chamber, for instance, mounted to a sump of the dishwashing appliance. The microphone may be capable of detecting audio characteristics of unwanted touch events, for example, touch events that may be detected when the door is in a loading position. Thus, the microphone may advantageously allow a controller of the dishwashing appliance to differentiate between unwanted and intentional touch events by detecting audio characteristics that may be indicative of an unwanted touch event. In the case of a unwanted touch event, for instance, an accidental key press, being detected, the controller of the dishwashing appliance may advantageously restrict the functionality of the user interface panel. For instance, by suspending a capacitive touch functionality of the user interface panel or resetting the operational settings of the dishwashing appliance to a previous selection that may have been made prior to the unwanted touch event. This may advantageously ensure that the operation of the dishwashing appliance may be carried out as intended.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of operating a dishwashing appliance comprising a cabinet defining a wash chamber, a door mounted to the cabinet to selectively restrict access to the wash chamber, a user interface panel mounted to the door, and a sump positioned outside of the wash chamber, the method comprising:

recording an audio signal with a first microphone mounted to the sump;

analyzing the audio signal recorded with the first microphone, wherein analyzing the audio signal comprises identifying audio characteristics indicative of an engagement sound from the user interface panel within the recorded audio signal;

determining an access position of the door based on the analyzed audio signal; and directing the dishwashing appliance based on the determined access position of the door.

2. The method of claim 1, wherein the access position of the door is determined to be a loading position based on the audio characteristics indicative of the engagement sound from the user interface panel being identified.

3. The method of claim 2, wherein directing the dishwashing appliance comprises resetting a settings profile stored within a memory to a previous settings profile in response to the access position of the door being determined to be the loading position.

4. The method of claim 1, further comprising:

recording the audio signal with a second microphone, wherein the second microphone is mounted to the door and positioned adjacent to the user interface panel; and analyzing the audio signal recorded with the second microphone.

5. The method of claim 4, wherein determining the access position of the door is based on the analyzed audio signal recorded with the first microphone and the analyzed audio signal recorded with the second microphone.

6. The method of claim 1, further comprising:

recording visual feedback from the door with an optical instrument mounted within the dishwashing appliance; and analyzing the visual feedback recorded with the optical instrument.

7. The method of claim 6, wherein determining the access position of the door is based on the analyzed audio signal recorded with the first microphone and the analyzed visual feedback recorded with the optical instrument.

8. The method of claim 1, further comprising:

receiving a position signal corresponding to the door from a sensor assembly attached to the cabinet; and analyzing an angular position of the door based on the received position signal.

9. The method of claim 8, wherein determining the access position of the door is based on the analyzed audio signal recorded with the first microphone and the analyzed angular position recorded with the sensor assembly.

10. A dishwashing appliance comprising:

a cabinet defining a wash chamber;

a sump positioned outside of the wash chamber;

a first microphone mounted to the sump;

a door mounted to the cabinet to selectively restrict access to the wash chamber;

a user interface panel mounted to the door; and a controller operable for:

recording an audio signal with the first microphone;

analyzing the audio signal recorded with the first microphone, wherein analyzing the audio signal comprises identifying audio characteristics indicative of an engagement sound from the user interface panel within the recorded audio signal;

determining an access position of the door based on the analyzed audio signal; and directing the dishwashing appliance based on the determined access position of the door.

11. The dishwashing appliance of claim 10, wherein the access position of the door is determined to be a loading position based on the audio characteristics indicative of the engagement sound from the user interface panel being identified.

12. The dishwashing appliance of claim 11, wherein directing the dishwashing appliance comprises resetting a settings profile stored within a memory to a previous settings profile in response to the access position of the door being determined to be the loading position.

13. The dishwashing appliance of claim 10, further comprising a second microphone, wherein the second microphone is mounted to the door and positioned adjacent to the user interface panel, and wherein the controller is further operable for:

recording the audio signal with the second microphone; and analyzing the audio signal recorded with the second microphone.

14. The dishwashing appliance of claim 13, wherein determining the access position of the door is based on the analyzed audio signal recorded with the first microphone and the analyzed audio signal recorded with the second microphone.

15. The dishwashing appliance of claim 10, further comprising an optical instrument mounted within the dishwashing appliance and wherein the controller is further operable for:

recording visual feedback from the door with the optical instrument; and analyzing the visual feedback recorded with the optical instrument.

16. The dishwashing appliance of claim 15, wherein determining the access position of the door is based on the analyzed audio signal recorded with the first microphone and the analyzed visual feedback recorded with the optical instrument.

17. The dishwashing appliance of claim 10, further comprising a sensor assembly attached to the cabinet, and wherein the controller is further operable for:

receiving a position signal corresponding to the door from the sensor assembly; and analyzing an angular position of the door based on the received signal.

18. The dishwashing appliance of claim 17, wherein determining the access position of the door is based on the analyzed audio signal recorded with the first microphone and the analyzed angular position recorded with the sensor assembly.

* * * * *